July 15, 1941.  E. D. JONES  2,249,291
HAND CONTROL FOR MOTOR VEHICLES
Filed Jan. 22, 1940  3 Sheets-Sheet 1
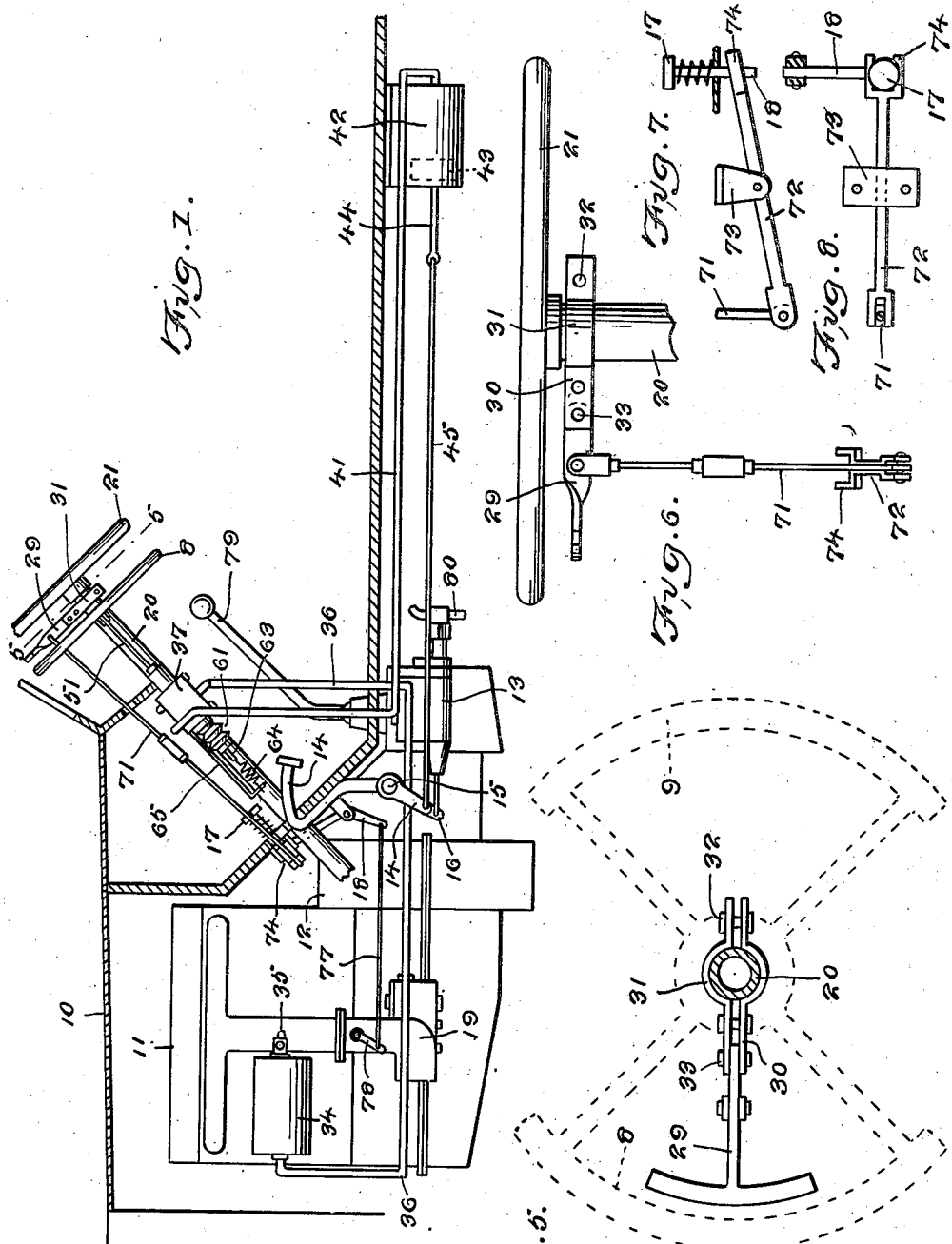
Edward D. Jones
INVENTOR
BY Victor J. Evans & Co.
ATTORNEYS July 15, 1941.  E. D. JONES  2,249,291
HAND CONTROL FOR MOTOR VEHICLES
Filed Jan. 22, 1940  3 Sheets-Sheet 2
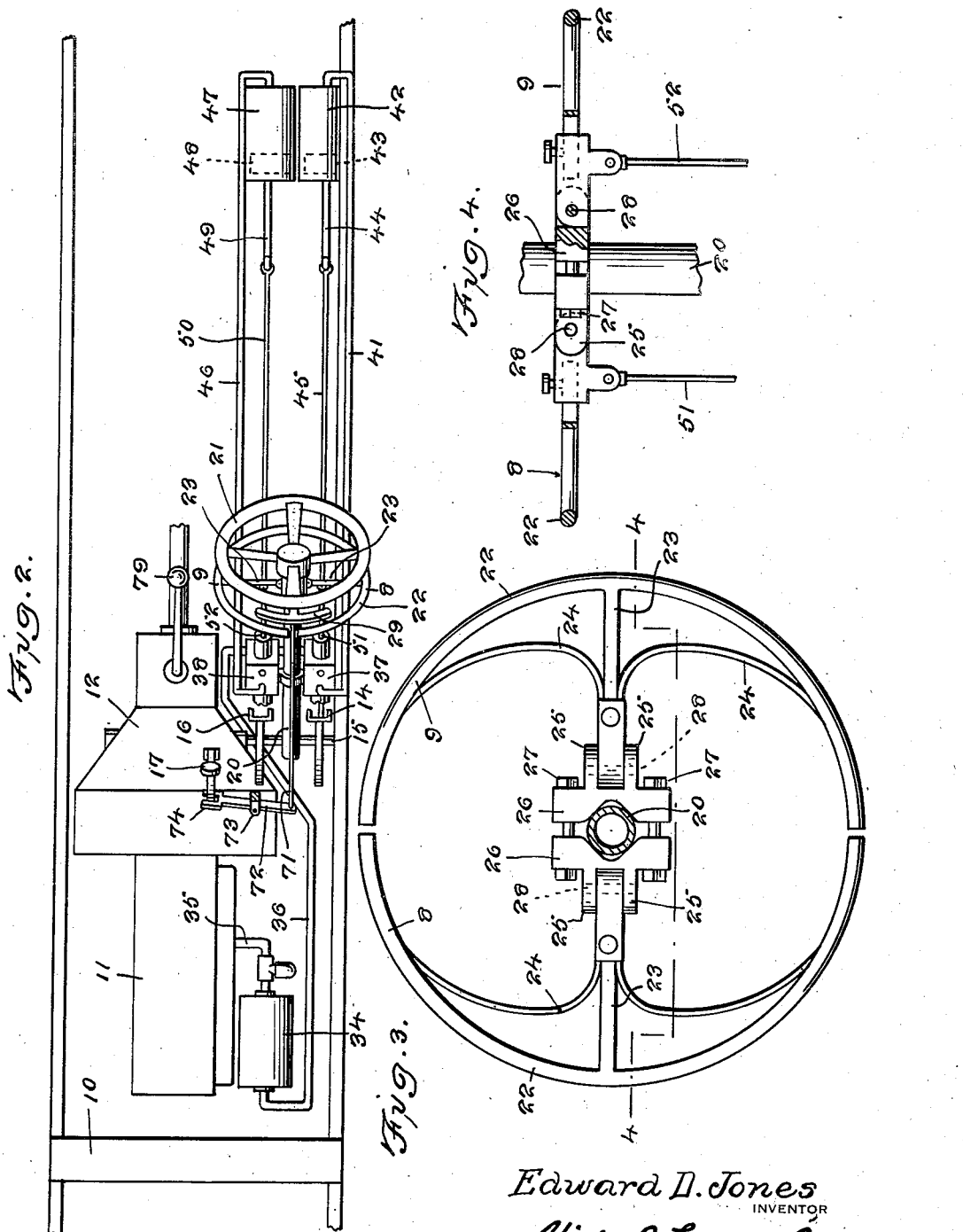
Edward D. Jones
INVENTOR
BY Victor J. Evans & Co.
ATTORNEYS

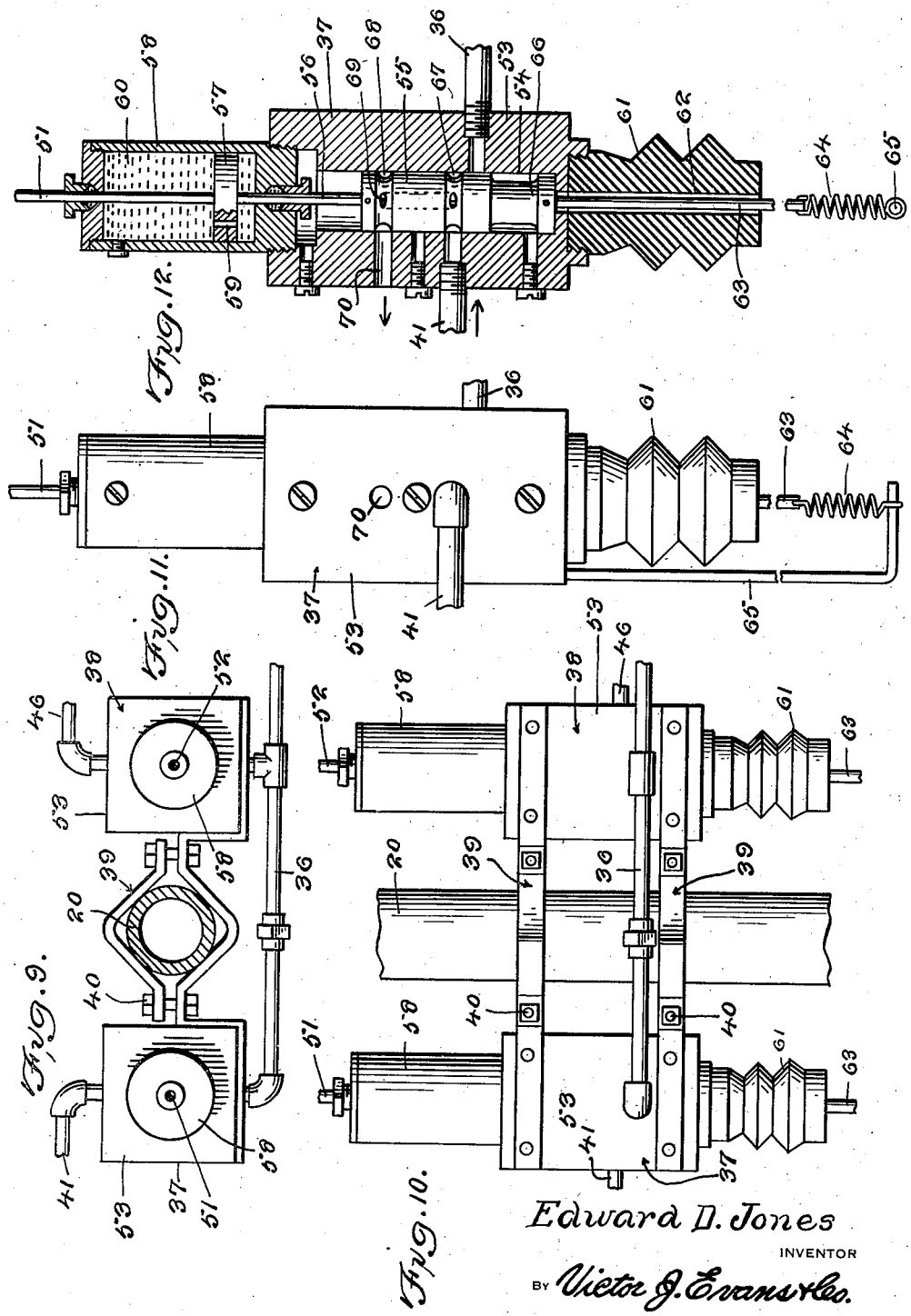

Patented July 15, 1941

2,249,291

UNITED STATES PATENT OFFICE 2,249,291

HAND CONTROL FOR MOTOR VEHICLES

Edward D. Jones, Pittsburgh, Pa.

Application January 22, 1940, Serial No. 315,077

1 Claim. (Cl. 188—152)

This invention relates to a hand control for motor vehicles and has for an object to provide a simplified vacuum power operator and valve therefor which may be operated by the little fingers of the driver, without removing the hands from the steering wheel, to control the brakes, and the clutch.

A further object is to provide a device of this character including a main vacuum tank connected to the intake manifold and connected to vacuum cylinders, the pistons of which are connected to the brake and clutch pedals, the vacuum being selectively controlled by a valve mechanism which is operated by respective half wheels disposed just below the conventional steering wheel and within the reach of the driver's little fingers.

A further object is to provide apparatus of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming a part of this specification:

Figure 1 is a fragmentary longitudinal sectional view of a motor vehicle equipped with a hand control constructed in accordance with the invention.

Figure 2 is a plan view of the parts shown in Figure 1.

Figure 3 is a plan view of the two half wheels which are pivoted to the steering column for controlling the respective vacuum valves of the clutch and brakes.

Figure 4 is a longitudinal sectional view taken on the line 4—4 of Figure 3.

Figure 5 is a detail cross sectional view taken on the line 5—5 of Figure 1 and showing the accelerator control in plan.

Figure 6 is a side elevation of the accelerator control.

Figure 7 is a front elevation of the pivoted accelerator lever which is connected to the accelerator control.

Figure 8 is a plan view of the parts shown in Figure 7.

Figure 9 is a plan view of the two vacuum valves attached to the steering column.

Figure 10 is a front elevation of the valves shown in Figure 9.

Figure 11 is a side elevation of the valves shown in Figure 9.

Figure 12 is a longitudinal sectional view of one of the vacuum valves.

Referring now to the drawings in which like characters of reference designate similar parts in the various views, 10 designates the chassis, 11 the motor, 12 the clutch, 13 the brake reservoir, 14 the clutch pedal, 15 the clutch operating shaft, 16 the brake pedal, 17 the accelerator pedal, 18 the accelerator arm, 19 the carburetor, 20 the steering column and 21 the steering wheel, these parts all being conventional motor vehicle parts.

In carrying out the invention two companion half wheels 8 and 9 are mounted on the steering column 20, as best shown in Figure 3, one on the left side and the other on the right side of, and below, the steering wheel 21 to control respectively the clutch pedal 14 and the brake pedal 16. The half wheels each comprise a rim 22, a spoke 23 reinforced by a brace 24, and received between hinge ears 25 carried by companion clamp sections 26 which are secured to opposite sides of the steering column 20 by bolts 27, as shown in Figure 3. A pivot pin 28 is passed through each spoke and the respective hinge ears to pivotally mount the half wheels on the steering column close underneath the steering wheel so that the left half wheel 8 may be reached by the little fingers of the operator's left hand to control the clutch and the right half wheel 9 may be reached by the little fingers of the right hand to control the brakes without removing either the left or the right hand from the steering wheel.

The accelerator control is also mounted on the steering column and comprises a T-shaped lever 29, best shown in Figure 5. The shank of the lever extends radially with respect to the steering column 20 and the head of the lever extends along and underneath the top of the steering wheel so that the driver may operate it with the little fingers of either hand which grips the top of the steering wheel. The shank of the lever is received between straight arms 30 of a two-part clamp ring 31 which is bolted to the steering column as shown at 32. A pivot pin 33 is passed through the shank of the lever and through the arms 30 to mount the lever for pivotal movement on the steering wheel.

By now referring to the Figures 1 and 2, it will be seen that a vacuum tank 34 is connected by a safety valve controlled pipe 35 to the intake manifold of the motor 11. A vacuum pipe 36 leads from the vacuum tank to a pair of control valves 37 and 38, corresponding respectively to the clutch and to the brakes. These control valves, as best shown in Figures 9 and 10, are secured to one of the members of a two-part bracket 39 which is bolted upon the steering column 20 as shown at 40, substantially midway between the ends of the steering column.

A vacuum pipe 41 leads from the clutch control valve 37 to a vacuum cylinder 42, best shown in Figure 2, having a piston 43 therein, the rod 44 of which is connected by a link 45 to the clutch pedal 14. A vacuum pipe 46 leads from the brake control valve 38 to a vacuum cylinder 47 having a piston 48, the rod 49 of which is connected by a link 50 to the brake control pedal 16. When either of the valves is opened, the piston in the corresponding vacuum cylinder will be pulled rearwardly by vacuum exerted there against from the vacuum tank 34 to depress the respective pedal of either the clutch or the brake.

For opening the valves selectively, as best shown in Figure 4, a link 51 is connected at the upper end to the spoke of the clutch controlling half wheel 8 and is connected at the lower end to the clutch valve 37. A link 52 is connected at the upper end to the spoke of the brake controlling half wheel 9 and is connected at the lower end to the brake valve 38. When the driver closes his grip upon the steering wheel and clutch controlling half wheel 9, the clutch valve will be opened to admit vacuum to the clutch controlling vacuum cylinder 42 and when the operator closes his grip upon the steering wheel and upon the brake controlling half wheel 8, the brake valve will be opened to admit vacuum to the brake controlling vacuum cylinder 48.

The clutch valve and the brake valve are duplicates of each other so that a description of one will suffice for both. By referring to Figures 11 and 12 it will be seen that each valve comprises a housing 53 having a longitudinal chamber 54 in which is slideably mounted a piston 55. The piston is provided with an upper piston rod 56 which is connected to the piston 57 of a dash pot 58 which closes the upper end of the chamber 54. The piston 57 of the dash pot of the clutch controlling valve is connected to the lower end of the link 51 of the clutch controlling half wheel, and the piston of the dash pot of the brake controlling valve is connected to the link 52 which is connected to the brake controlling half wheel. The dash pot piston is provided with a port 59 through which the oil 60, or other liquid, passes from one side of the piston to the other when the piston is moved.

The lower end of the chamber 54 is closed by a plug 61 having an axial bore 62 which receives a lower piston rod 63 which projects from the valve piston 55. The lower end of the rod 63 is attached to the upper end of a helical spring 64 having its lower end attached to an L-shaped bracket arm 65 which extends downwardly from the valve housing 53. Each time the respective half wheel is moved upward to raise the piston 55 from neutral position to operative position the spring 64 will be extended and tensioned to return the piston to neutral position when the half wheel is released.

The piston 53 is provided near the lower end with a circumferential groove 66 adapted to connect the brake or brake vacuum pipe 41 or 46, as the case may be, and the vacuum pipe from the vacuum cylinder 34 when the piston is moved upwardly to respectively actuate the clutch or the brake. Above the groove 66 the piston is provided with a lower circumferential groove 67 and upper circumferential groove 68, these grooves being connected by a longitudinal bypass 69 formed in the piston. In neutral position of the piston 55 the clutch or brake vacuum pipe, as the case may be, is vented to the atmosphere through the by-pass 69 and a port 70 which is formed in the wall of the housing 53 and communicates with the atmosphere.

Referring now to Figures 6, 7 and 8, it will be seen that the accelerator lever 29 is connected by a link 71 to one end of a rocker arm 72 which is pivoted intermediate its ends on a stationary bracket 73 and is provided at the free end with a fork 74 which straddles the stem of the accelerating pedal 17, and bears against the bell crank arm 18, the lower arm of which is connected by a connecting rod 77 to the throttle valve lever 78 of the carburetor, as best shown in Figure 1. When the driver closes the hand upon the steering wheel and the accelerator lever 29 the lever will be raised to rock the forked end 74 of the rock arm downwardly to depress the accelerator pedal and open the throttle valve.

In operation, the ignition switch is closed and the driver assumes natural position of the hands on the steering wheel. To start the vehicle the left hand is closed upon the steering wheel and the little fingers thereof placed underneath the clutch controlling half wheel 8 to raise the wheel and open the clutch controlling valve 37 to permit vacuum from the vacuum tank 34 being exerted upon the piston 43 of the clutch cylinder 42 to move the piston outwardly and through the link 45 depress the clutch pedal 14 and disengage the clutch. The conventional starter button is then pressed to start the motor. Thereupon, the accelerator lever 29 may be lifted by the little fingers of the hand grasping the top of the steering wheel to raise the link 71 and depress the accelerator pedal 76 and move the bell crank arm 18 to open the throttle valve to accelerate the motor. The gear shift lever 79 may now be manipulated to put the vehicle in gear in the usual manner.

When it is desired to apply the brakes the driver engages the little fingers of the right hand underneath the brake controlling half wheel 9 to raise the link 52 and open the brake valve 38 to establish communication between the vacuum tank 34 and brake cylinder 47 through the vacuum pipe 46. Vacuum exerted against the piston 48 moves the link 50 to depress the brake pedal 16 and operate the brake reservoir 13 to apply the brakes through the hydraulic brake pipes 80.

From the above description it is thought that the construction and operation of the invention will be fully understood without further explanation.

What is claimed is:

A control mechanism for clutch and brake actuating pedals comprising, the combination with a pedal of a lever adapted to be manually operated, a vacuum tank connected to the intake manifold of a motor vehicle, a vacuum cylinder having a piston therein connected to the pedal, a vacuum controlling valve having a housing connected to the vacuum tank and to the vacuum cylinder, a dash pot closing the upper end of the housing and connected to the lever, a piston in the housing having an upper piston rod connected to the dash pot and having a lower piston rod extending through the bottom of the housing, a spring connected to the lower piston rod and the housing for holding the piston in neutral position, the piston being provided with a passage adapted to connect the vacuum tank with the vacuum cylinder through the housing when the piston is in operative position, the piston being provided with a by-pass adapted to connect the vacuum cylinder with the atmosphere through the housing in the neutral position of the piston, vacuum from the vacuum tank being exerted upon the piston in the vacuum cylinder when the vacuum controlling valve in the housing is in operative position to actuate the pedal.

EDWARD D. JONES.